J. J. McKNIGHT.
Extension Table.

No. 231,437.   Patented Aug. 24, 1880.

UNITED STATES PATENT OFFICE.

JOHN J. McKNIGHT, OF TARRYTOWN, NEW YORK.

EXTENSION-TABLE.

SPECIFICATION forming part of Letters Patent No. 231,437, dated August 24, 1880.

Application filed October 25, 1879.

*To all whom it may concern:*

Be it known that I, JOHN J. MCKNIGHT, of Tarrytown, in the county of Westchester and State of New York, have invented a new and useful Improvement in Extension-Tables; and I hereby declare the following to be a full and clear description thereof, reference being had to the accompanying drawings, forming part of the same.

This invention relates to certain improvements in the construction of extension-tables, hereinafter described, by means of which the various sections may be easily slid to and fro and automatically locked in position.

Figure 1:
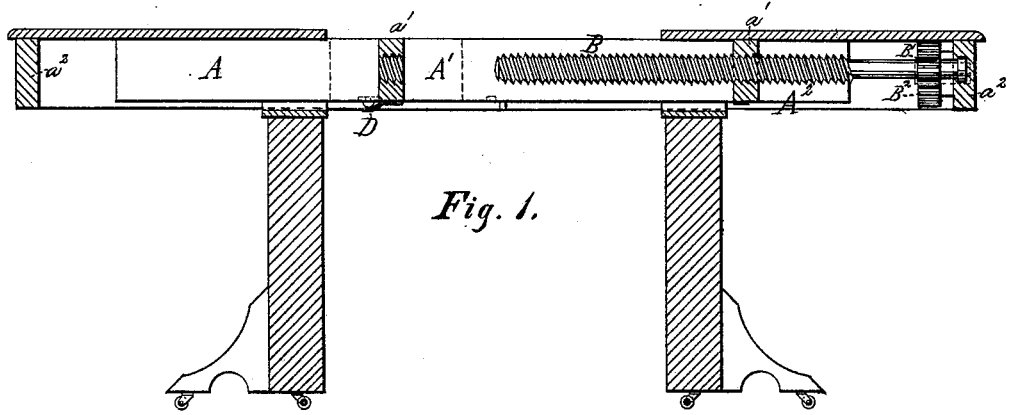
Figure 2:
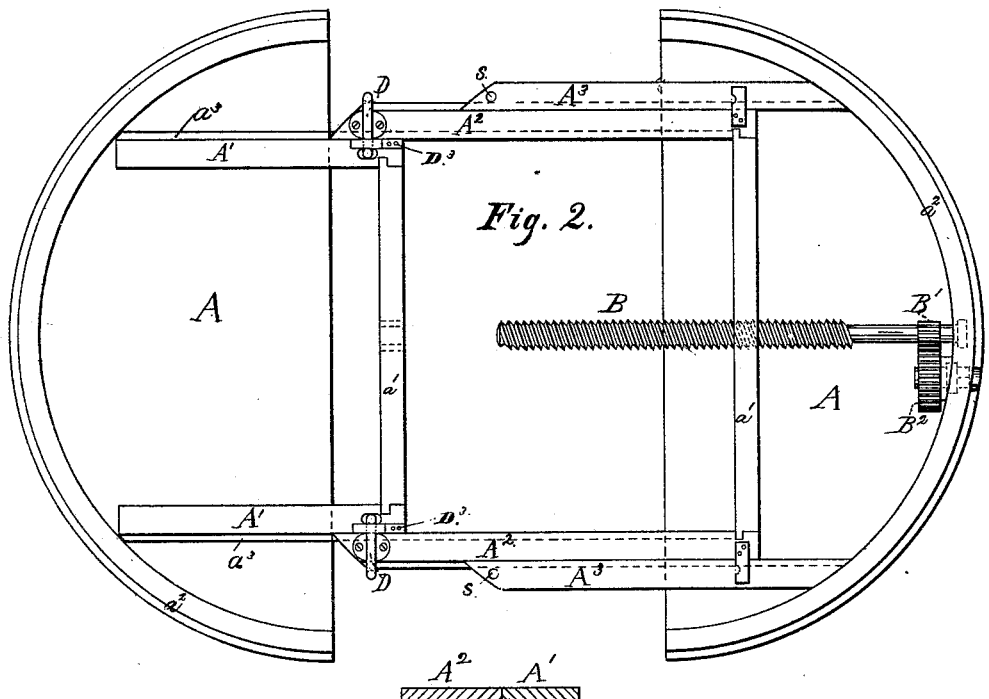
Figure 3:
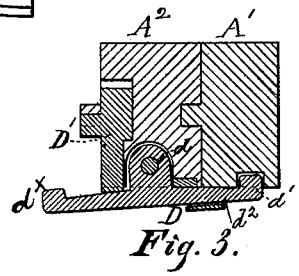

Figure 1 is a longitudinal sectional elevation of one of the improved tables. Fig. 2 is a bottom plan of the same. Fig. 3 is a detailed sectional elevation of one of the automatic catches for holding the different sections of the table in place as they are drawn out.

A A represent the table-top. $A'$ $A^2$ $A^3$ are slides for supporting the several leaves or portions of the table-top. These slides are drawn out and retracted by means of a screw, to be hereinafter described. Along the outer side of each slide $A'$ is formed a tongue, $a^3$, which slides within a groove formed in the inner side of each of the central slides, $A^2$, each outer side of which is formed with a tongue similar to the tongue $a^3$, which engages in corresponding grooves formed in the inner sides of the outer slides, $A^3$. The slides $A'$ and $A^3$ are secured at their outer ends to the end sections of the table, while the ends of the slides $A^2$ and the inner ends of the slides $A'$ are secured to cross-pieces or ties $a'$, which also serve to connect the whole of the slides together.

B represents the actuating-screw, which is threaded into the cross-pieces or ties $a'$, and is actuated by means of pinions $B'$ $B^2$, $B^2$ being the driving-pinion, and being actuated by means of a suitable crank passing through a hole in the end of the table-frame.

D D are self-locking catches, pivoted at $d$ to one of the slides, (such as $A^2$,) and arranged to lock into the adjoining slides $A'$ $A^3$ by means of their projections $d'$ $d^\times$ taking into suitable mortises in said slides $A'$ $A^3$. These catches and their retaining-mortises are arranged so as to hold the different slides together at the proper locations to have the various leaves or sections that form the top of the table drop into their proper places.

The locking device or catch D is arranged to work automatically by having its end $d^2$ made heavier than the other end, so that it (said end $d^2$) may drop down and cause the end or clutch $d^\times$ to enter its mortise $s$ in $A^3$ by the simple action of gravity upon the end $d^2$.

The projection upon the end $d^2$ of catch D is forced up into the mortise in slide $A'$ by the pressure upon said end $d^2$ of a plate, $D^3$, which holds said end in place and locks the slides $A'$ and $A^2$ together.

The locking block or slide $D'$ is fitted into a vertical groove in one of the slides $A^2$, so as to allow it to slide a short distance vertically in a free and easy manner. As the sections of the table are moved apart these slides will strike the free end or arm of the piece D (shown in Fig. 3) and raise the projection or clutch $d'$ at the opposite end into its retaining-mortise in the slides $A'$ at the proper moment to hold the sections in their desired locations. Then when the sections of the table are drawn together the said locking-pieces $D'$ will be moved, with their attached slides $A'$, off of the piece D in time to release the clutch or projection $d'$ from its mortise and allow the section which has hitherto been held in place in its extended position to slide up into its closed position.

$D^3$ $D^3$ represent flat plates secured at one end to the slides $A'$, their other ends being free and acting to press the end $d'$ of the catch D into its appropriate mortise and hold it there, thus acting to lock the catch D in position.

Having thus described my invention, what I claim as new therein, and desire to secure by Letters Patent, is—

1. The combination of the slides $A'$ $A^2$ $A^3$, the outer slides having mortises on their under sides, the catch D, pivoted to the central slide, $A^2$, and having weighted arm $d^2$, and at its ends on its upper side projections $d'$ $d^\times$, plate $D^3$, cross-pieces $a'$, and screw B, substantially as described.

2. The combination of the slides $A'$ $A^2$ $A^3$, cross-pieces $a'$ $a'$, catch D, pivoted to the central slide, $A^2$, and having weighted arm $d^2$ and projections $d'$ $d^\times$, plate $D^3$, screw B, and locking-block $D'$, substantially as and for the purpose described.

JOHN J. McKNIGHT.

Witnesses:
P. E. RAQUÉ,
A. F. DYER.